US 6,705,381 B2

(12) United States Patent
Huang

(10) Patent No.: US 6,705,381 B2
(45) Date of Patent: Mar. 16, 2004

(54) ADJUSTABLE SHADE UNFOLDABLE IN MULTIPLE DIRECTIONS

(76) Inventor: Sunny E. L. Huang, 786 Via Monte Video, Claremont, CA (US) 91711

( * ) Notice: Subject to any disclaimer, the term of this patent is extended or adjusted under 35 U.S.C. 154(b) by 0 days.

(21) Appl. No.: 10/118,549

(22) Filed: Apr. 8, 2002

(65) Prior Publication Data
US 2002/0108726 A1 Aug. 15, 2002

Related U.S. Application Data

(63) Continuation-in-part of application No. 09/766,557, filed on Jan. 19, 2001, which is a continuation of application No. 09/417,277, filed on Oct. 13, 1999, now Pat. No. 6,192,967.
(60) Provisional application No. 60/104,703, filed on Oct. 19, 1998, and provisional application No. 60/284,976, filed on Apr. 20, 2001.

(51) Int. Cl.⁷ .................................................. A47H 3/00
(52) U.S. Cl. .............................. 160/370.23; 160/84.07; 160/370.22; 296/97.7; 296/97.9
(58) Field of Search ....................... 160/370.21, 370.22, 160/370.23, 84.07, 134; 296/97.7, 97.8, 97.9

(56) References Cited

U.S. PATENT DOCUMENTS

| 1,475,647 A | 11/1923 | Naterman |
| 1,675,909 A | 7/1928 | Riker |
| 1,732,447 A | 10/1929 | Crane |
| 1,790,333 A | 1/1931 | Tubman |
| 1,808,652 A | 6/1931 | Gump |
| 1,927,137 A | 9/1933 | Soukup |
| 2,065,242 A | 12/1936 | Omerly, Jr. |
| 2,489,901 A | 11/1949 | Kocinski |
| 2,596,836 A | 5/1952 | Bruhl |
| 2,598,770 A | 6/1952 | Drozt |
| 2,599,066 A | 6/1952 | Osborn |
| 2,614,630 A | 10/1952 | Moszelt |
| 2,751,977 A | 6/1956 | Pinkerton |
| 2,843,421 A | 7/1958 | Shelton |
| 2,897,002 A | 7/1959 | Yovich |
| 2,979,129 A | 4/1961 | Ketchum |
| 3,042,111 A | 7/1962 | Wytovich |
| 3,046,048 A | 7/1962 | Cheney |
| 3,151,662 A | 10/1964 | Fait |
| 3,184,264 A | 5/1965 | Ealey et al. |
| 3,336,969 A | 8/1967 | Marchman |
| 3,373,792 A | 3/1968 | Lessard |
| 3,740,092 A | * 6/1973 | Page ........................... 296/105 |
| 4,205,895 A | * 6/1980 | Yurdin et al. .................. 350/60 |
| 4,227,542 A | 10/1980 | Bonfilio |
| 4,332,414 A | 6/1982 | Surtin |
| 4,440,187 A | 4/1984 | Fiddler |
| 4,442,881 A | * 4/1984 | Monteath et al. ............. 160/25 |
| 4,560,245 A | 12/1985 | Sarver |
| 4,606,572 A | 8/1986 | Maguire |
| 4,652,039 A | 3/1987 | Richards |
| 4,671,558 A | 6/1987 | Cline |
| 4,681,149 A | 7/1987 | Tung-Chow |
| 4,699,195 A | 10/1987 | Lester |
| 4,736,980 A | 4/1988 | Eubanks |
| 4,763,947 A | 8/1988 | Gregg |

(List continued on next page.)

FOREIGN PATENT DOCUMENTS

| FR | 1256866 | 2/1961 |
| IT | 689866 | 4/1965 |
| JP | 6-40254 | 2/1994 |

Primary Examiner—Bruce A. Lev
(74) Attorney, Agent, or Firm—Paul M. Denk

(57) ABSTRACT

A car window sun screen structure, which consists of a fold away sun screen and a supporting frame. The characteristics include the length of the supporting frame as adjustable; a rubbers supporting pad on each end of the supporting frame so that the supporting frame so that the supporting frame can be fixed on the edge of car windows to install the sun screen.

10 Claims, 5 Drawing Sheets

U.S. PATENT DOCUMENTS

| | | | | |
|---|---|---|---|---|
| 4,784,215 A | | 11/1988 | Sing | |
| 4,790,591 A | | 12/1988 | Miller | |
| 4,818,007 A | | 4/1989 | Mahoney | |
| D301,449 S | | 6/1989 | Silva | |
| 4,861,090 A | | 8/1989 | Gavrieli | |
| 4,862,943 A | | 9/1989 | Shafia | |
| 4,874,026 A | * | 10/1989 | Worrall | 160/23.1 |
| 5,010,939 A | | 4/1991 | King | |
| 5,035,460 A | | 7/1991 | Huang | |
| 5,101,878 A | * | 4/1992 | Thomas | 160/370.2 |
| 5,139,070 A | * | 8/1992 | Kidd | 160/84.1 |
| 5,183,092 A | * | 2/1993 | Jelic | 160/84.1 |
| 5,207,257 A | | 5/1993 | Rupel et al. | |
| 5,222,261 A | * | 6/1993 | Tooze et al. | 4/608 |
| 5,291,934 A | * | 3/1994 | Ouvrard et al. | 160/310 |
| 5,024,262 A | | 7/1994 | Huang | |
| 5,344,206 A | * | 9/1994 | Middleton | 296/97.8 |
| 5,598,883 A | | 2/1997 | Platsis | |
| 5,615,725 A | * | 4/1997 | Ming-Shun | 160/370.22 |
| 5,657,810 A | | 8/1997 | Levy et al. | |
| 5,660,220 A | | 8/1997 | Ruan | |
| 5,694,998 A | | 12/1997 | Chen | |
| 5,765,619 A | | 6/1998 | Arnold | |
| 5,778,955 A | * | 7/1998 | Chen | 160/84.06 |
| 5,967,161 A | | 10/1999 | Neal | |
| 6,089,245 A | | 7/2000 | Tseytlin et al. | |
| 6,095,230 A | | 8/2000 | Mitchell et al. | |
| 6,135,191 A | | 10/2000 | Mitchell et al. | |
| 6,192,967 B1 | | 2/2001 | Huang | |
| 6,202,732 B1 | | 3/2001 | Chen | |
| 6,407,365 B1 | * | 6/2002 | De Prete, III | 219/203 |

* cited by examiner

ADJUSTABLE SHADE UNFOLDABLE IN MULTIPLE DIRECTIONS

CROSS-REFERENCE TO RELATED APPLICATION

This application is a regular letters application, non-provisional, on the provisional application Ser. No. 60/284,976, filed on Apr. 20, 2001; and this application is continuation-in-part of application having Ser. No. 09/766,557, filed on, Jan. 19, 2001, which is continuation of application Ser. No. 09/417,277, filed Oct. 13, 1999, now U.S. Pat. No. 6,192,967, which, in turn claimed benefit to U.S. Provisional Application No. 60/104,703, filed Oct. 19, 1998, all of which are incorporated herein by reference, and for which this current application claims continuation-in-part status.

STATEMENT REGARDING FEDERALLY SPONSORED RESEARCH OR DEVELOPMENT:

N/A

BACKGROUND OF THE INVENTION

This invention relates primarily to a car sun screen, and more particularly to a type of screen that may be more permanently installed, and capable of being folded into a usable position, to shade and screen the interior of the vehicle from sun rays, or the like, or refolded back into a storage position.

The use of sun screens, in vehicles, has long been used. Initially, in the early days of vehicles, curtains were employed to provide a little more privacy to the interior of the vehicle, located at particular windows, such as along the side panels, and which could be shifted into closure, or opened for viewing. In the last twenty to thirty years, since medical science has determined that the sun, and its ultraviolet rays, can have a very deleterious effect upon the skin, and particularly leading towards the incidence of carcinoma, people have become more cautious in how much sun they are exposed to, and how to shelter themselves from the same.

In addition, particularly in very hot weather, and where the vehicle may be parked for some time, such as by the worker, while employed all day, the interior of the vehicle can become exceedingly hot, particularly due to the reflections of the sun upon the windshields or vehicle glass, which has a magnifying effect to enhance the interior heat of the vehicle, during such nonusage. Hence, this invention provides a screening method, built into the vehicle, or installed thereto, and which can provide temporary screening, as required or desired, by the vehicle owner or any occupant.

SUMMARY OF THE INVENTION

As previously reviewed, this invention relates principally to providing a car sun screen within select windows of the vehicle that may be readily installed for usage, or retracted to allow the driver or occupants to readily see from the vehicle.

This invention contemplates the formation of more permanent types of screens, structured incorporating cloth or polymer type screen that may be collapsed, such as along a series of flutes, for folding back into a storage position, during nonusage, or expanded across a window to provide for desired sun screening. In one embodiment, the screen includes a pair of side supporting frames, one of which has the fluted screen material connected thereto, and which material can be extended, and expanded, to the opposite side supporting frame, for securement therewith, when providing the desired sun screening within the vehicle. In addition, a base frame may be provided to furnish guidance to the screen material, as it is extended, and to add further support and rigidity to it, during its usage and application.

A further embodiment one of such screens may be located to either side of the window, and pulled centrally, to the midpoint thereof, with each screen providing coverage for at least of the window during its application.

A further embodiment utilizes similar type of structure, as previously described, where a side supporting frame holds the fluted screen material, while a base frame secures at least the leading downward edges of the screen material thereto, and which can be extended, for providing coverage to a side window within a vehicle, as can be understood.

Further and various types of structural components may be utilized within this invention to provide for the support of the polymer screen material, such as Mylar, in place, so that it may be collapsed about its flutes along one side supporting frame, but extended by the base frame, either into an operative position, or withdrawn, as during nonusage.

As can be determined from this invention, the screens, constructed in this manner, may either be linearly extended, or expanded, into a usable position, or they may be folded in pivotal manner, from a side supporting frame, towards the base frame, during application and usage, particularly when applied into the side windows of a vehicle.

The principal object of this invention is to provide for a collapsible screen that may be used to furnish shelter from the sun, within a vehicle, when installed into its usable condition, or retracted, as when the vehicle was being driven.

These and other objects may become more apparent to those skilled in the art upon reviewing the invention as described herein, and upon undertaking a study of the description of its preferred embodiment, in view of the drawings.

DESCRIPTION OF THE PREFERRED EMBODIMENT

Figure 1:
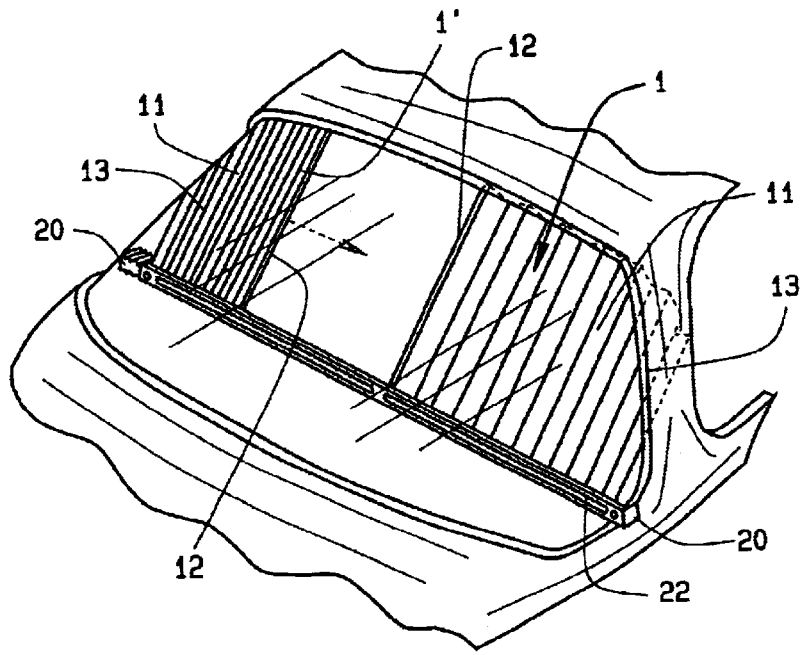
FIG. 1 provides a perspective of part of a vehicle showing the adjustable shade of this invention located in place.
Figure 2:
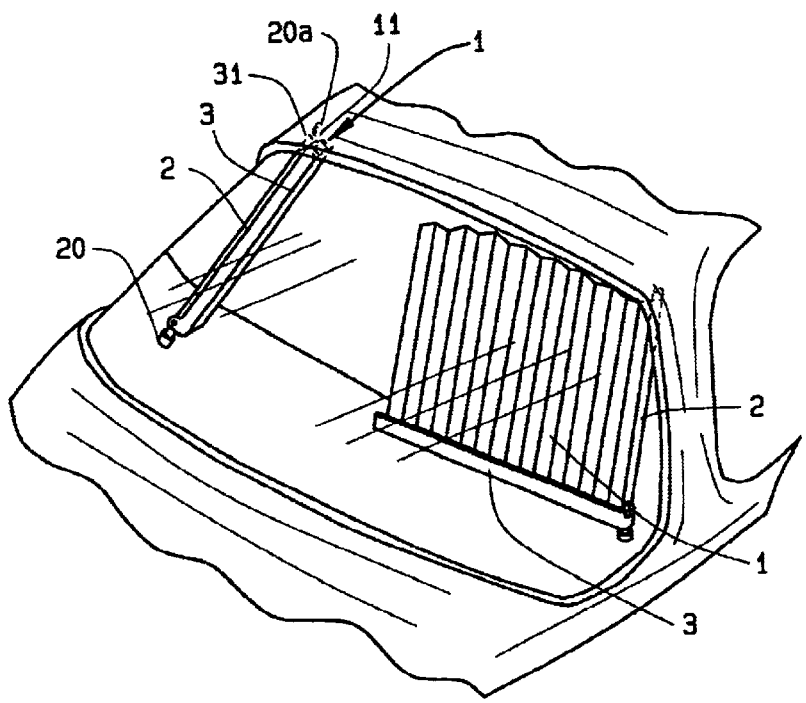
FIG. 2 discloses the installation of the adjustable shade of this invention, in either the windshield, or rear window, of a vehicle.
Figure 3:
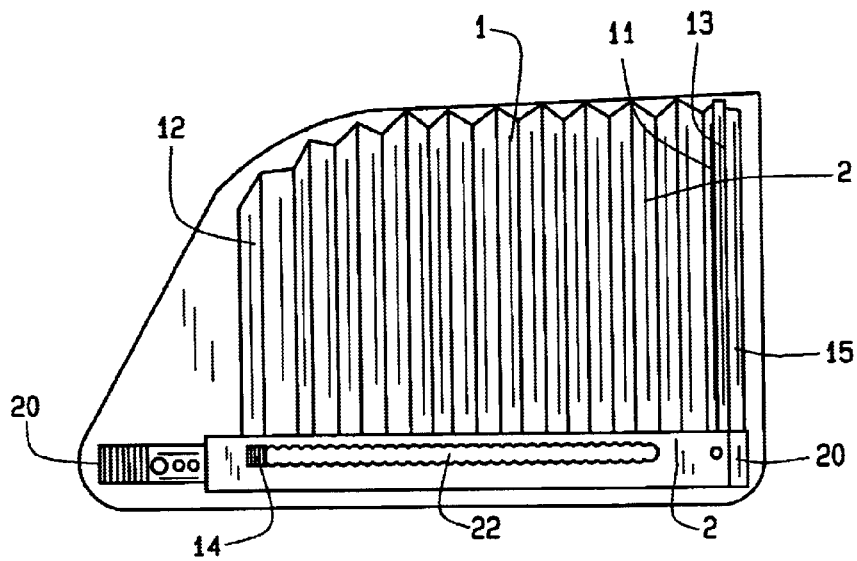
FIG. 3 provides a view of a modified type of adjustable shade that is applied to the side windows of a vehicle.

In referring to FIGS. 1 and 2, the "car sun screen" of this invention mainly consists of a fold-away sun screen 1, and a side supporting frame 2. The screen of the invention is actually a two-part screen, one being provided to each lateral side of the vehicle window, as noted, and each of which can be extended centrally, to provide screening to the interior of the vehicle. The characteristics of this screen include the length of the side supporting frame 2, and which is adjustable, and which can be installed within the vehicle between the base of the window, as by its downward end 20, and the upper interior of the vehicle just above the window, as at its upper end 20A. Rubber supporting pads are also provided at the bottom and top of the ends 20 and 20A, in order to cushion their mounting, and to provide friction for their adherence in place. These are provided for fixing the side supporting frames to the edge of the car window, and to install the sun screen 1.

The side supporting frames have a slot located along their length, and which can accommodate the securement of the folded sun screen thereto, when installed. The sun screen may be made of fabric, or a polymer, such as Mylar, and be pleated in order to accommodate its folding when retracted into a nonusable position. When extended, into an open position, the sun screen 1 has an approximate rectangular shape, or may be generally cut to the shape of the car window, during its installation, to provide more efficient coverage when screening the rays of the sun from entering therein.

Or, the side supporting frame may include a rotating arm 13, at one side, of the base frame 22, and the base frame may include a slot 21, as noted. See FIG. 4. When extended, the rotating arm 13 of the sun screen 1, can stretch the outside edge 12 of the sun screen to the desired shape, as extended, in order to provide coverage across the vehicle window, as can be understood. When closed, or when the sun screen is retracted during nonusage, the screen 1 is stored in the holding slot 21, of the base supporting frame 22. This is an additional storage means, wherein the member 13, after the sun screen us fully retracted against it, can pivot downwardly, about its pivot point 13a, for further storage.

Figure 4:
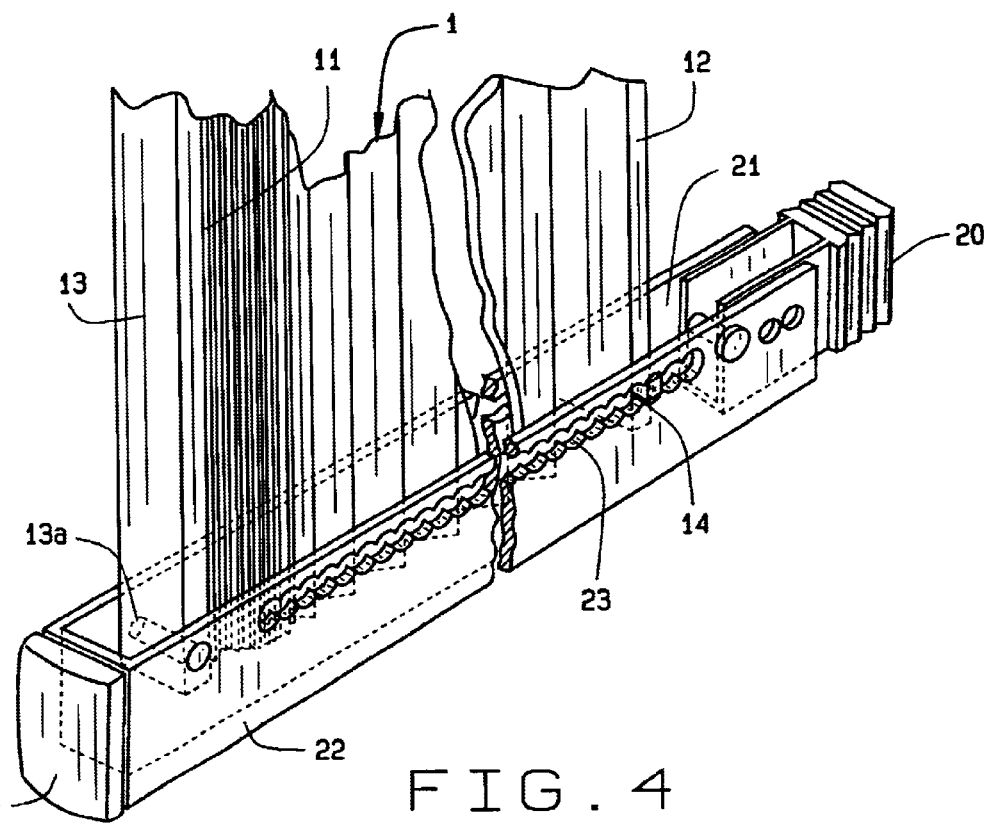
FIG. 4 shows in further detail, a part of the adjustable shade of this invention, indicating how the base support functions to attain lateral sliding in either extending its screen into a shading position, or retracting the same, during nonusage.

As stated above, for this usage, the side supporting frames 2 are fixed to the window edge. There is also a groove 23 in the side wall of the holding channel 22, of the base supporting frame 3. There is also an adjustable buckle 14 at the end of the outside of the sun screen, as noted. In FIG. 4, if the distance between the rotating arm 13 and the edge of the car window is too large, a small section of the sun screen 1 can be installed on the side of the rotating or pivotal arm 13.

In referring to FIG. 1, once again, the sun screen can be divided into two sections, 1 and 1', as noted, and installed onto the two ends of the base supporting member 22, so that the pivotal arms 13 can open in two directions, and then pulled towards the center, as along their movable support 12, to achieve the desired result of providing screening over the entire window, even though the vehicle may be of extensive width.

In referring to FIG. 2, once again, the side supporting frame 2 is fixed to one end of the window frame vertically. The cover 3, with its holding groove 31, on one end of the supporting frame 2, is then fixed with the inside edge of the sun screen 1, on the edge of the supporting frame 2. When the cover 3 is opened, from the supporting frame 2, the outside edge 12 of the sun screen 1 can be opened and pulled along the base supporting frame 3, to extend the screen to achieve its desirable shape and coverage of the interior of the window. The sun screen 1 can also be folded back into its nonusable position.

Figure 5:
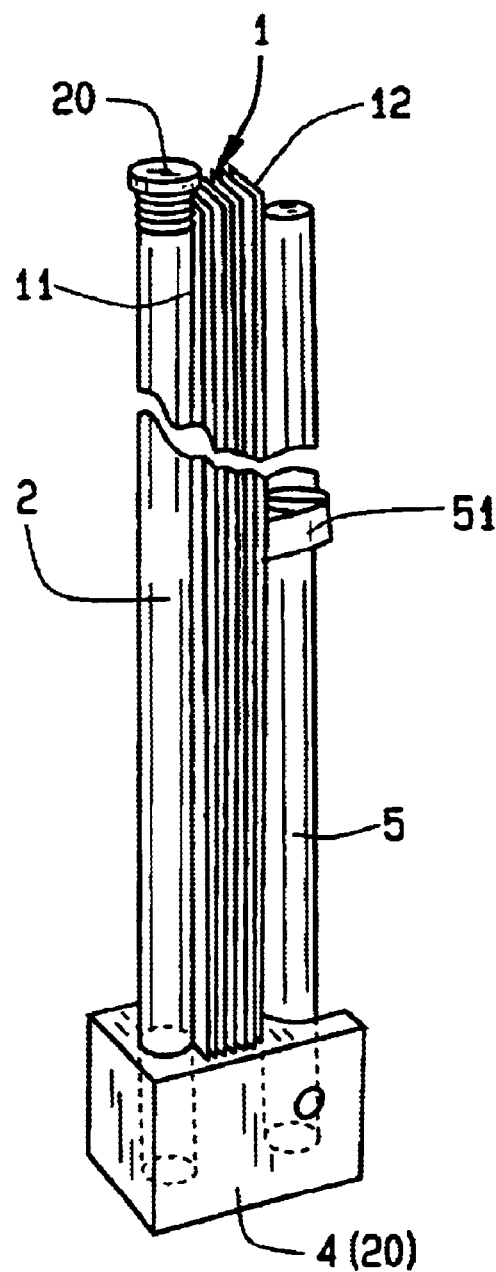
FIG. 5 is a view of a further modified adjustable shade of the pivotal type where its screen may be pivoted, laterally, to furnish shading, particularly to the side window of a vehicle.

In referring to FIG. 5, there is provided a connector 4, for this modified type of adjustable shade, and it fixes one end of the adjustable side supporting frame 2, as noted. There is also a rotating or pivotal arm 5, on one side of the connector 4, as can be seen. The sun screen 1 is installed between the side supporting frame 2, and the pivotal arm 5, so that its inside edge 11, of the sun screen 1, is fixed on the side of the side supporting frame 2, and the outside edge, as at 12, is fixed to the pivotal arm 5. When the pivotal arm 5 is pivoted open, the sun screen 1 will have a fan type shape, to achieve the desired result of furnishing screening, against the entrance of sun or light, into the vehicle, particularly along its side windows. Usually the side windows of a vehicle have an arcuate configuration, along the back upper edge, and by pivoting this modified screen it provides for significant coverage over the side window, as can be understood. Thus, when the sun screen 1 is opened, it will have a fan-like shape to achieve its desirable result. The sun screen 1 can also be folded and placed between the side supporting frame 2, and the pivotal arm 5, during closure. A band 51 may be provided to one side of the pivotal arm 5, for the convenience of the user, and allow a means for grasping when manipulating the screen between its usable and storage positions.

Figure 6A:
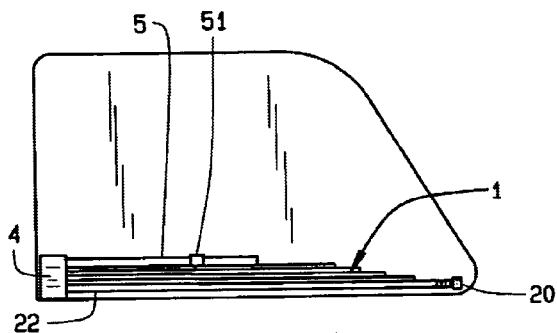
FIG. 6A shows the modified adjustable shade of FIG. 5, collapsed into a nonusable position.
Figure 6B:
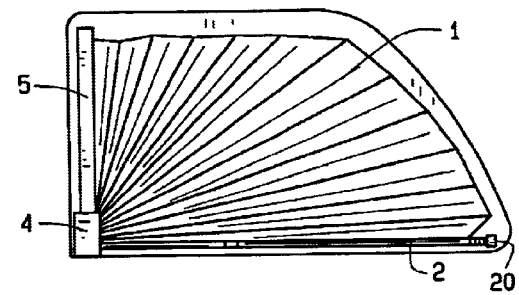
FIG. 6B shows the modified adjustable shade extended into its screening position.

In referring to FIGS. 6A and 6B, in this particular instance, the base supporting frame 22 is fixed at the bottom edge of the window, generally horizontally aligned. Thus, when the pivotal arm 5 is shifted upwardly, into a vertical position, about its connector 4, it furnishes coverage and screening over a substantial portion of the side window of the vehicle, as can be readily seen in FIG. 6B.

Figure 7A:
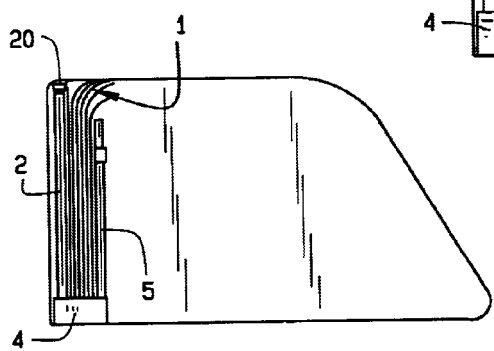
FIG. 7A shows a further modified type of adjustable screen, of the pivotal type, pivoted into its nonusable position.
Figure 7B:
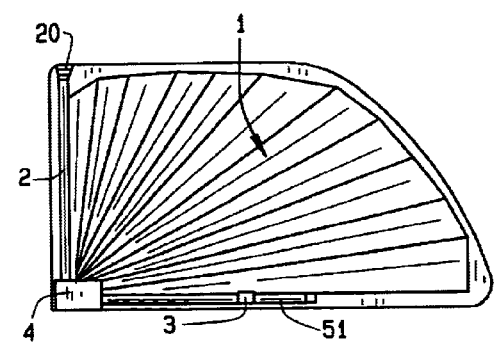
FIG. 7B shows the modified adjustable shade extended into its screening position.

FIGS. 7A and 78 show a similar type of adjustable shade that as previously reviewed in FIG. 6, but in this particular instance, the side supporting frame 2 is vertically installed, and secured in position between its connector 4, and the upper frictional hold means 20, as noted. Then, the pivotal arm 5 can be extended downwardly, to extend its sun screen 1 overlying interiorly a significant portion of the vehicle window, as can be noted. As stated above, the sun screen can be cut into required shapes to match generally with the shape of the window, in which it is to be installed, and to provide shading. When the sun screen is opened, it will naturally cover a portion of the entire window, to achieve the optimal sun screen results.

Figure 8:
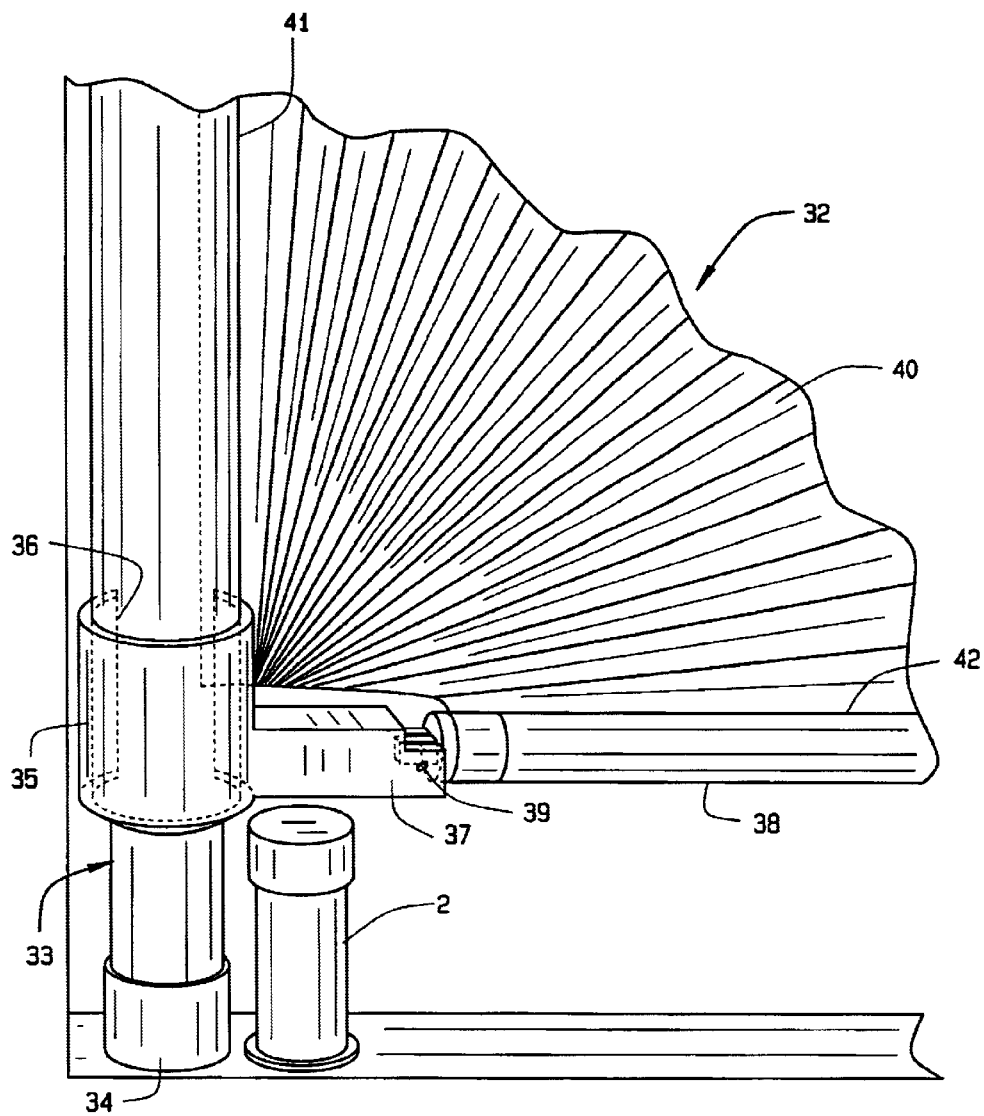
FIG. 8 is a partial view of an additional frame for connecting within the car window, and capable of pivotally extending to provide a window screen during usage.

In referring to FIG. 8, an alternative to the adjustable shade of this invention can be seen as 32. This also is a window type of shade, generally one that is arranged upon the side windows of a vehicle, and includes a support rod 33 which may extend upwardly for some distance, generally approximating the height of the window frame, and even provide a length slightly beyond that, so that the rod 33 can be compressed, inserted within the window frame, and then released for retention therein for holding the shade in place. Such a rod may be of the spring bias type, as known in the art, where an internal spring (not shown) may extend within a telescoping type of rod, which may form the rod 33, and be compressed, located in place within the window frame, released, for allowing its end caps 34, one each provided at both the upper and lower ends of the rod, to compress into a tight holding position within the window frame, during usage. Or, the rod may be of a threaded type that can be extended, by threaded expansion, to allow for tightening of the rod 33 within the window frame. A sleeve 35 may slidingly located upon the rod 33, and have a reasonably snug sliding relationship upon the rod, so that the sleeve can be raised or lowered, relative thereto, as required to provide for its positioning, for usage, within the window frame. The sleeve may provide a slot, as at 36, to allow for its expansion, and locating upon the rod 33, or it may slide over one of the ends of the rod 33, for its locating in place, for sliding motion, upon the rod 33.

A laterally extending arm 37 has connected thereto, a pivot rod 38, being pivoted at the location 39, so that the pivot rod 38 may be extended laterally, or horizontally, as shown, relative to the support rod 33, as can be noted. Screen material 40 connects along one side edge 41 to the rod 33, while the opposite edge 42 of the screen material may locate and secure upon the pivot rod 38, as noted.

Thus, when the shade 32 is located within the window frame, in a manner as previously explained, the sleeve 35 will be raised or lowered in order to provide clearance for the standard latch L of the door lock, as noted, and at this stage, when it is desired to provide a screen, over the window, so as to shield the entrance of sunlight, or for other purposes, the pivotal rod 38 may be pivoted laterally, as noted, to extend the screen over the window, and provide the shade as necessary. Obviously, the screen 40 will be cut to dimensions that provides for as complete of coverage for the window, when used, as desired.

Or, when the shade is no longer needed, the pivot rod 38 may be pivoted upwardly, in the manner as previously described for other embodiments of this invention, and latched in place, to be held out of usage, when not employed for shade purposes.

Briefly stated, the adjustable shade of this invention, in its various modifications, can achieve its desired results and serve as an improved type of car window sun screen for its users and vehicle owners. It is both convenient and practical for its intended purposes, and therefore, meets the requirements of useful results to be derived from this invention, in its various modifications.

Variations or modifications to the subject matter of this invention may occur to those skilled in the art upon reviewing the subject matter of this invention as described herein. Such variations or modifications are intended to be encompassed within the scope of the invention as described herein. The description of the preferred embodiment and the various structures of this auto shade invention, as reviewed herein, are set forth for illustrative purposes only.

Number Illustrations:

1 - Sun Screen
2 - Supporting Frame
3 - Cover
4 - Connector
5 - Rotating Arm
11 - Inside Edge
12 - Outside Edge
13 - Rotating Arm
14 - Adjustable Buckle
15 - Cover Board
20 - Rubber Supporting Pad
21 - Holding Slot
22 - Wave-shaped Groove
31 - Holding Groove

Having thus described the invention, what is claimed and desired to be secured by Letters Patent is:

1. A car window sun screen structure, comprising:
   a supporting frame comprising a base member and an arm pivotally connected to said base member; at least one of said base member and said arm being adapted to secure said sun screen structure in a frame of a car window and including a supporting pad on each end of the base member so that said supporting frame can be secured in a window frame of a car adjacent a window of the car window;
   a sun screen secured along a first edge thereof to the base member and being secured along a second edge thereof to the arm; said first and second edges of said sun screen being adjacent each other; and said sun screen being laterally extendable along the base member for arrangement adjacent to car window to provide shading from the entrance of sunlight into the vehicle and through the car window.

2. The car window sun screen structure as in claim 1, wherein said supporting frame member is adapted to be fixed at a bottom edge and top edge of the car window frame to be arranged substantially vertically thereof, said base being tubularly configured, and having a holding slot extending along its length, whereby the sun screen can be folded and stored through the slot within the tubular frame, and said sun screen is capable of being laterally extended to stretch over the car window and screen against the entrance of any sunlight.

3. The car window sun screen structure of claim 1, including a second supporting frames having a second sun screen attached thereto, and said first and second sun screens capable of being pulled towards each other and joined when extended to shade against the entrance of sunlight through the car window.

4. A car window sun screen structure comprising:
   a supporting frame comprising an upright rod and an arm operatively mounted to said rod, said arm being movable axially along said upright rod and being pivotal between a first position in which said arm is generally parallel to said rod and a second position in which said arm is generally perpendicular to said rod;
   a sun screen connected along a first edge to the upright rod and along a second edge to the arm, such that when the arm is pivoted from the first position to the second position, the screen expands to cover the car window and prevent entrance of sunlight into the vehicle.

5. The car window sun screen of claim 4, wherein said upright rod is expandable to provide for its adjustment and is adapted to be interconnected between upper and lower window frames of the car window, for emplacement of the sun screen structure during usage.

6. The car window sun screen of claim 5 wherein said upright rod is telescopically constructed and includes spring means provided within the telescoping rod to bias it into its expanded configuration.

7. The car window sun screen of claim 5 and including a sleeve provided upon and slidable along the upright rod, said arm being operatively mounted to said sleeve to provided for selective placement of said arm, and hence said screen, along said rod.

8. The car window sun screen of claim 7 and including an arm integrally extending from the sleeve, and said rod being pivotally connected to said arm.

9. The car window sun screen of claim 8, wherein said sleeve and its integral arm are capable of sliding vertically to provide clearance for operative components of the window frame during application of said sun screen structure during usage.

10. A The car window sun screen structure of claim 1 including a connector fixed between the upright rod and the pivotal rod to affix the collapsed screen during nonusage.

* * * * *